US012698956B2

(12) United States Patent
Yang et al.

(10) Patent No.: US 12,698,956 B2
(45) Date of Patent: Aug. 4, 2026

(54) METHODS AND SYSTEMS FOR SENSING DEFORMATION

(71) Applicant: HONEYWELL INTERNATIONAL INC., Charlotte, NC (US)

(72) Inventors: Fan Yang, Charlotte, NC (US); Jun Wang, Charlotte, NC (US); Yu Hu, Charlotte, NC (US); Houyong Wang, Charlotte, NC (US); Wu Chen, Charlotte, NC (US)

(73) Assignee: Honeywell International Inc., Charlotte, NC (US)

( * ) Notice: Subject to any disclaimer, the term of this patent is extended or adjusted under 35 U.S.C. 154(b) by 258 days.

(21) Appl. No.: 18/444,127

(22) Filed: Feb. 16, 2024

(65) Prior Publication Data

US 2024/0302156 A1 Sep. 12, 2024

(30) Foreign Application Priority Data

Mar. 9, 2023 (CN) ......................... 202310225147.X

(51) Int. Cl.
*G01B 5/30* (2006.01)
*G01B 7/16* (2006.01)
*G01B 7/24* (2006.01)

(52) U.S. Cl.
CPC ................. *G01B 7/18* (2013.01); *G01B 7/22* (2013.01); *G01B 7/24* (2013.01)

(58) Field of Classification Search
None
See application file for complete search history.

(56) References Cited

U.S. PATENT DOCUMENTS 5,574,447 A 11/1996 Roylance
6,578,434 B1 6/2003 Maubant et al.
(Continued)

FOREIGN PATENT DOCUMENTS

CN 107830795 A 3/2018
CN 110411353 A * 11/2019 ............. G01B 11/02
(Continued)

OTHER PUBLICATIONS

English Translation of KR Office Action dated Apr. 14, 2025 for KR Application No. 10-2024-0033030, 4 page(s).
(Continued)

*Primary Examiner* — John E Breene
*Assistant Examiner* — Alex T Devito
(74) *Attorney, Agent, or Firm* — Alston & Bird LLP

(57) ABSTRACT

Methods, apparatuses and systems for a sensing deformation in a surface are disclosed herein. An example device may include a support unit including a first frame and a second frame. A first end of the first frame and a first end of the second frame are mechanically coupled to the surface. The sensing device includes a pin joint that mechanically couples the first frame to the second frame, such that a first relative movement between the first end of the first frame and the first end of the second frame is amplified to a second relative movement between a second end of the first frame and a second end of the second frame. The sensing device includes a sensor that senses the second relative movement between the second end of the first frame and the second end of the second frame.

19 Claims, 13 Drawing Sheets

(56) References Cited

U.S. PATENT DOCUMENTS

| | | | |
|---|---|---|---|
| 7,854,174 | B2 | 12/2010 | Aebersold et al. |
| 10,474,769 | B2 | 11/2019 | Williams |
| 2001/0054317 | A1 | 12/2001 | Arms |
| 2014/0196296 | A1 | 7/2014 | Tu et al. |
| 2015/0135857 | A1 | 5/2015 | Kawamura et al. |
| 2017/0045378 | A1 | 2/2017 | Fukuda et al. |
| 2018/0372562 | A1 | 12/2018 | Keller et al. |
| 2020/0249128 | A1 | 8/2020 | Hart |
| 2021/0188093 | A1 | 6/2021 | Gyani |
| 2022/0109010 | A1 | 4/2022 | He et al. |
| 2023/0032112 | A1 | 2/2023 | Pokora et al. |
| 2023/0182288 | A1 | 6/2023 | Rowe et al. |
| 2024/0318949 | A1 | 9/2024 | Yang et al. |

FOREIGN PATENT DOCUMENTS

| | | |
|---|---|---|
| CN | 218211169 U | 1/2023 |
| GB | 2542475 A | 3/2017 |
| KR | 10-1239220 B1 | 3/2013 |

OTHER PUBLICATIONS

KR Office Action Mailed on Apr. 14, 2025 for KR Application No. 10-2024-0033030, 4 page(s).

Christopher Hendricks et al., "Lithium-Ion Battery Strain Gauge Monitoring and Depth of Discharge Estimation," Journal of Electrochemical Energy Conversion and Storage, 20(011008):1-8, (Feb. 2023). [Retrieved from the Internet Apr. 29, 2024: URL: <https://asmedigitalcollection.asme.org/electrochemical/article-abstract/20/1/011008/1140221/Lithium-Ion-Battery-Strain-Gauge-Monitoring-and?redirectedFrom=fulltext>].

Extended European Search Report Mailed on Jul. 15, 2024 for EP Application No. 24156153, 7 page(s).

Extended European Search Report Mailed on Jul. 15, 2024 for EP Application No. 24158480, 6 page(s).

Fan Yang et al., U.S. Appl. No. 18/597,283 for "Methods, Systems, and Devices for Detecting Deformation on a Surface", filed Mar. 6, 2024.

Non-Final Rejection Mailed on Feb. 27, 2026 for U.S. Appl. No. 18/597,283, 17 page(s).

English translation of KR Notice of Allowance dated Feb. 12, 2026 for KR Application No. 10-2024-0033030, 3 page(s).

KR Notice of Allowance Mailed on Feb. 12, 2026 for KR Application No. 10-2024-0033030, 3 page(s).

Intention to grant Mailed on Apr. 9, 2026 for EP Application No. 24156153, 6 page(s).

Intention to grant Mailed on May 6, 2026 for EP Application No. 24158480, 6 page(s).

Final Rejection Mailed on Jun. 17, 2026 for U.S. Appl. No. 18/597,283, 18 page(s).

* cited by examiner

BATTERY CELL
STRUCTURE 102

SURFACE 106

BOTTOM COVER
104

ELECTRIC VEHICLE
120

127

125

126

BUCKLE
208

DENTS OR
HOLES 204

200

SENSOR 210

250

SURFACE 206

250

SECOND END OF THE
FIRST FRAME 262

SECOND END OF THE
SECOND FRAME 272

SECOND LINE 258

FIRST FRAME
260

SECOND
DISTANCE
257

PIN JOINT
252

SECOND
FRAME
270

FIRST
DISTANCE
255

FIRST END OF THE
SECOND FRAME 271

FIRST END OF THE
FIRST FRAME
261

FIRST LINE 256

800

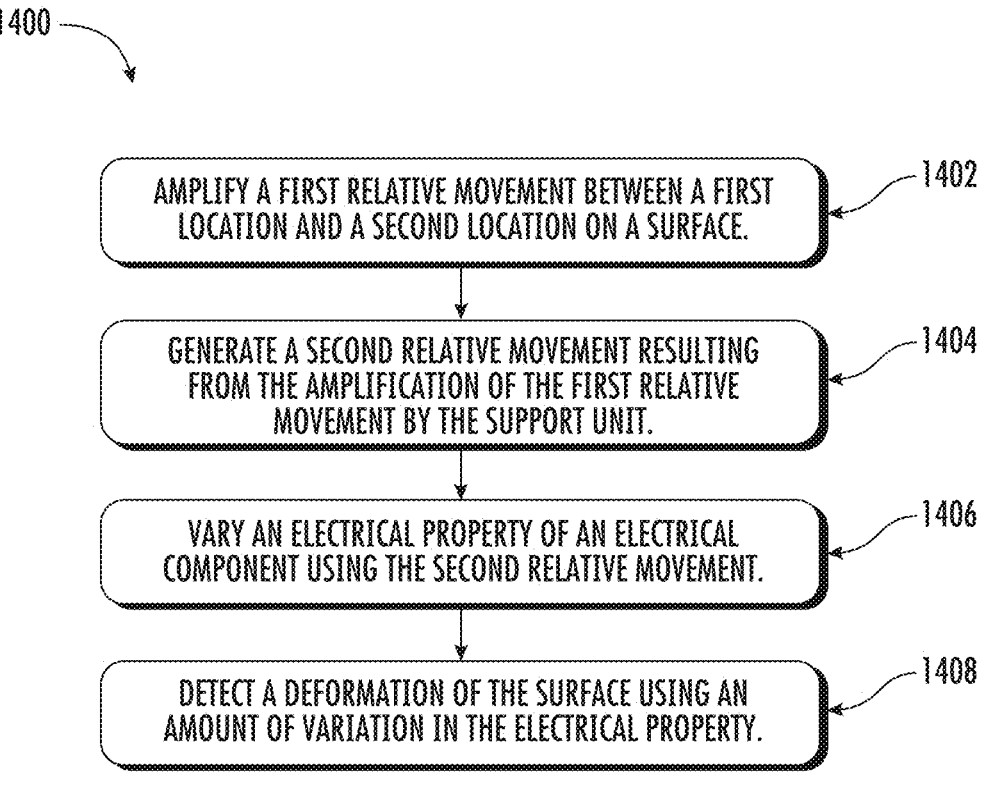

1400

AMPLIFY A FIRST RELATIVE MOVEMENT BETWEEN A FIRST LOCATION AND A SECOND LOCATION ON A SURFACE. — 1402

GENERATE A SECOND RELATIVE MOVEMENT RESULTING FROM THE AMPLIFICATION OF THE FIRST RELATIVE MOVEMENT BY THE SUPPORT UNIT. — 1404

VARY AN ELECTRICAL PROPERTY OF AN ELECTRICAL COMPONENT USING THE SECOND RELATIVE MOVEMENT. — 1406

DETECT A DEFORMATION OF THE SURFACE USING AN AMOUNT OF VARIATION IN THE ELECTRICAL PROPERTY. — 1408

FIG. 14

METHODS AND SYSTEMS FOR SENSING DEFORMATION

CROSS-REFERENCE TO RELATED APPLICATIONS

This application claims priority pursuant to 35 U.S.C. 119(a) to Chinese Application No. 202310225147.X, filed Mar. 9, 2023, which application is incorporated herein by reference in its entirety.

BACKGROUND

A deformation formed on a surface may lead to adverse consequences. For example, a deformation on a surface of bottom cover of an electric vehicle may damage the battery package and place the vehicle in a dangerous condition.

Applicant has identified many technical challenges and difficulties associated with detecting and sensing the presence of deformation on a surface. Through applied effort, ingenuity, and innovation, Applicant has solved problems related to detecting and sensing the presence of deformation on a surface by developing solutions embodied in the present disclosure, which are described in detail below.

BRIEF SUMMARY

Various embodiments described herein relate to methods, apparatuses, and systems for sensing. Various embodiments of the present disclosure provide a sensing device comprising a support unit comprising a first frame and a second frame, wherein a first end of the first frame and a first end of the second frame are configured to mechanically couple to a surface; and a pin joint configured to mechanically couple the first frame to the second frame, such that a first relative movement between the first end of the first frame and the first end of the second frame is amplified to a second relative movement between a second end of the first frame and a second end of the second frame; and a sensor mechanically coupled to the second end of the first frame and the second end of the second frame, the sensor configured to sense the second relative movement between the second end of the first frame and the second end of the second frame.

In various embodiments, a first distance between the pin joint and a first line passing through the first end of the first frame and the first end of the second frame is less than a second distance between the pin joint and a second line passing through the second end of the first frame and the second end of the second frame.

In various embodiments, the first relative movement is caused by a deformation of the surface. In various embodiments, the surface is on a bottom cover of an electric vehicle facing a battery of the electric vehicle. In various embodiments, the battery comprises a battery cell structure, wherein the battery cell structure and the bottom cover form a chassis of the electric vehicle.

In various embodiments, the sensor comprises a resistive strain gauge wherein a resistance varies due to the second relative movement and wherein the deformation is detected when the resistance is outside a normal resistance range.

In various embodiments, the sensor comprises a capacitive strain gauge wherein a capacitance of the strain gauge sensor varies due to the second relative movement and wherein the deformation is detected when the capacitance is outside a normal capacitance range.

In various embodiments, the sensor comprises an inductive strain gauge wherein an inductance of the strain gauge sensor varies due to the second relative movement and wherein the deformation is detected when the inductance is outside a normal inductance range.

In various embodiments, the sensor comprises a piezoelectric material, wherein the piezoelectric material generates a voltage due to the second relative movement and wherein the deformation is detected when the voltage is outside a normal voltage range.

In various embodiments, the first frame crosses the second frame at the pin joint and the first and second frames are each configured to pivot independently around the pin joint.

Various embodiments of the present disclosure provide a method comprising amplifying a first relative movement between a first location and a second location on a surface using a first frame and a second frame mechanically coupled to the first and second locations respectively and mechanically coupled to each other at a pin joint; generating a second relative movement resulting from the amplification of the first relative movement by the support unit; varying an electrical property of an electrical component using the second relative movement; and detecting a deformation of the surface using an amount of variation in the electrical property.

In various embodiments, the method comprises measuring the electrical property of the electrical component, comparing the electrical property of the electrical component with a first threshold and with a second threshold, and determining the deformation of the surface when the electrical property is higher than a first threshold or lower than a second threshold.

In various embodiments, the surface is on a bottom cover of an electric vehicle facing a battery of the electric vehicle. In various embodiments, the battery comprises a battery cell structure, wherein the battery cell structure and the bottom cover form a chassis of the electric vehicle.

In various embodiments, the electrical component comprises a resistive strain gauge and the electrical property comprises a resistance configured to vary due to the second relative movement and the method comprising detecting the deformation when the resistance is outside a normal resistance range.

In various embodiments, the electrical component comprises a capacitive strain gauge and the electrical property comprises a capacitance configured to vary due to the second relative movement and the method comprising detecting the deformation when the capacitance is outside a normal capacitance range.

In various embodiments, the electrical component comprises a piezoelectric material and the electrical property comprises a voltage generated by the piezoelectric material due to the second relative movement and the method comprising detecting the deformation when the voltage is outside a normal voltage range.

In various embodiments, the method comprises generating an alarm when the deformation is detected.

Various embodiments of the present disclosure provide a sensing system comprising a plurality of support units each comprising a first frame and a second frame, wherein a first end of each first frame and a first end of each second frame are configured to mechanically couple to a surface; a pin joint configured to mechanically couple each first frame to each corresponding second frame, such that a first relative movement between the first end of the first frame and the first end of the corresponding second frame is amplified to a second relative movement between a second end of the first frame and a second end of the corresponding second frame; and a sensor mechanically coupled to second ends of the plurality of the first frames and second ends of the plurality of the second frames, the sensor configured to sense the second relative movement.

In various embodiments, the sensor comprises an electrical component configured to have a variable electrical property as a result of the second relative movement, the sensing system comprising a controller configured to determine a deformation of the surface using an amount of variation in the electrical property.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which:

FIG. 14 is a flowchart illustrating a method in accordance with various embodiments of the present disclosure.

DETAILED DESCRIPTION OF THE INVENTION

Figure 1A:
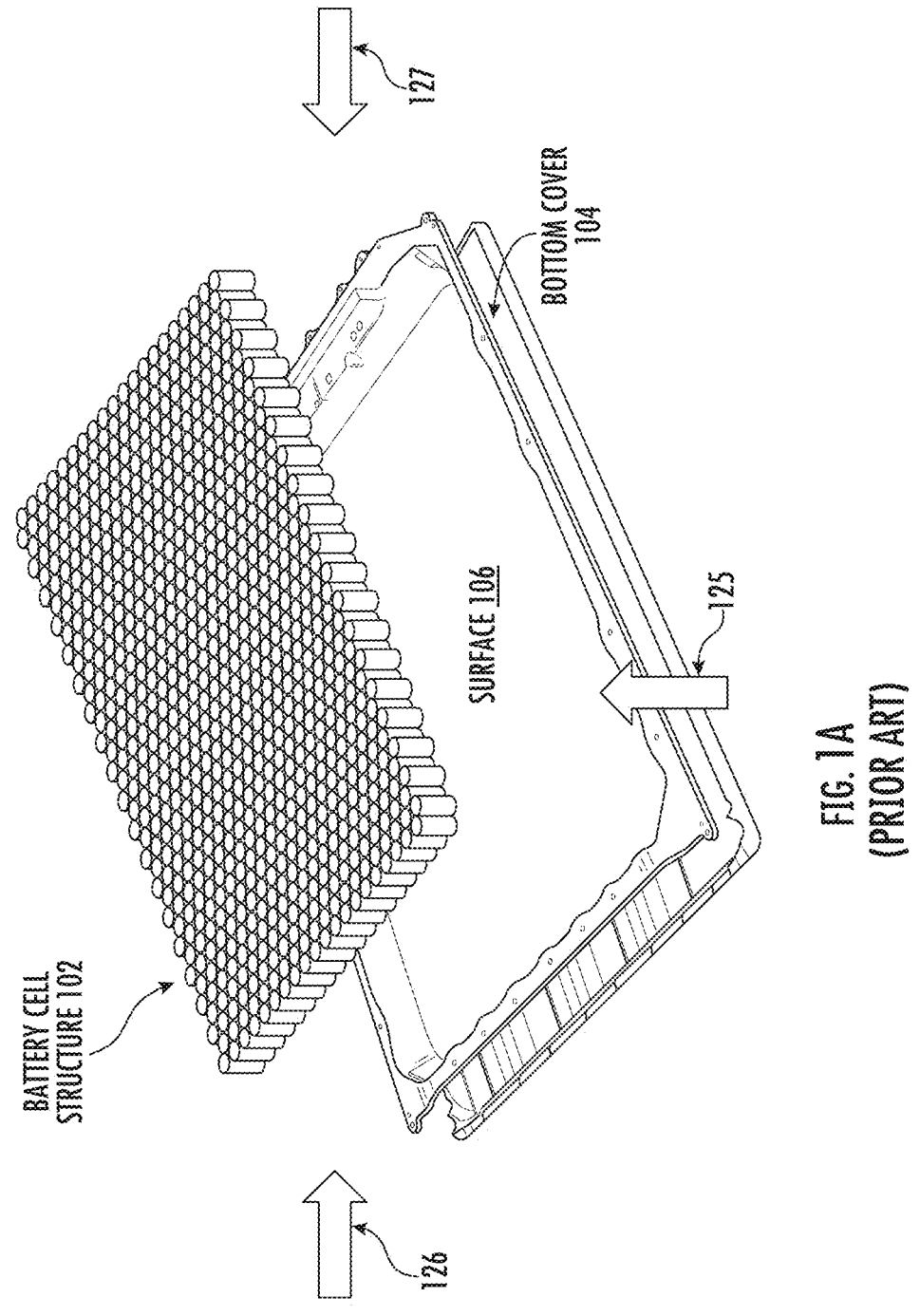
FIG. 1A illustrates an example schematic diagram depicting a battery cell structure and cover in accordance with the prior art.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

The components illustrated in the figures represent components that may or may not be present in various embodiments of the present disclosure described herein such that embodiments may include fewer or more components than those shown in the figures while not departing from the scope of the present disclosure. Some components/aspects may be omitted from one or more figures or shown in dashed line for visibility, clarity, and/or illustrative purposes, for example for visibility of the underlying components.

The phrases "in an example embodiment," "some embodiments," "various embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such components or features may be optionally included in some embodiments, or may be excluded.

The terms "electronically coupled" or "in electronic communication with" in the present disclosure refer to two or more electrical elements (for example, but not limited to, a controller, sensor, strain gauge, detection module, an example processing circuitry, communication module, input/output module, memory) and/or electric circuit(s) being connected through wired means (for example but not limited to, conductive wires or traces) and/or wireless means (for example but not limited to, wireless network, electromagnetic field), such that data and/or information (for example, electronic indications, signals) may be transmitted to and/or received from the electrical elements and/or electric circuit(s) that are electronically coupled.

The term "mechanically coupled" in the present disclosure refers to two or more mechanical elements (for example, but not limited to, a frame, a surface, a support unit, a joint, etc.) being physically connected directly or indirectly in various ways such as using fastener(s), screws, nails, clasps, clamps, joints, pin joint, axle, hinge, adhesive, welding, soldering, and/or any other intermediary part or component, etc. The term "mechanically coupled" may refer to any of movable, turntable, swiveling, pivoting, fixed, and/or stationary, etc.

Various surfaces may require monitoring with respect to deformation(s) and detection of a deformation on the surface. A deformation may include any of distortion, twist, buckle, bend, warp, crack, and/or hole and may be resulted from a damage, collision, degradation, and/or an external force, etc. on the surface.

In various embodiments, methods, systems, devices, and/or apparatuses are provided to detect a deformation on a surface. For example, the surface may be on a bottom cover of an electric vehicle, such as a surface on the bottom cover facing a battery of the electric vehicle. In various embodiments, any other surface such as other surfaces of vehicles, containers, airplanes, ships, and/or building structures, foundations, etc. may be monitored. In example embodiments, the surface is monitored continually and/or at various time intervals to detect the deformation.

Figure 1B:
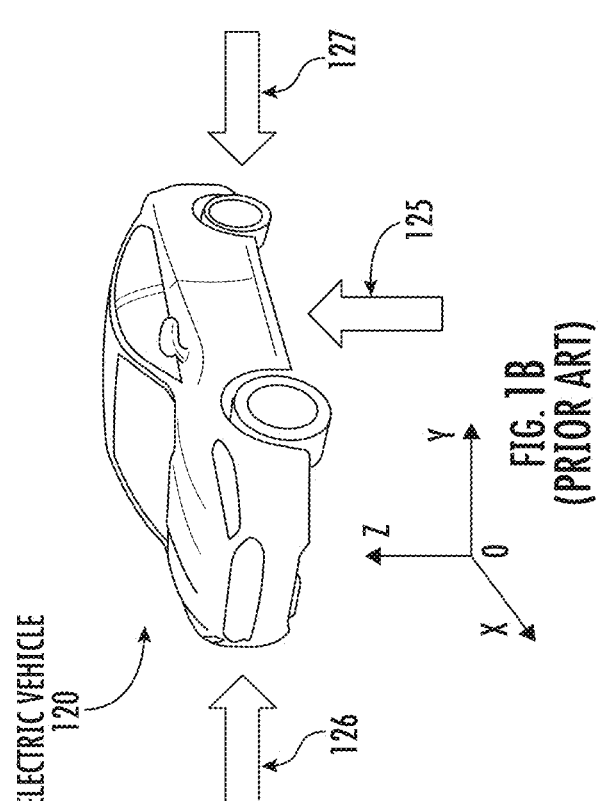
FIG. 1B illustrates an example schematic diagram depicting an electric vehicle having a battery cell structure and cover in accordance with the prior art.
Figure 1C:
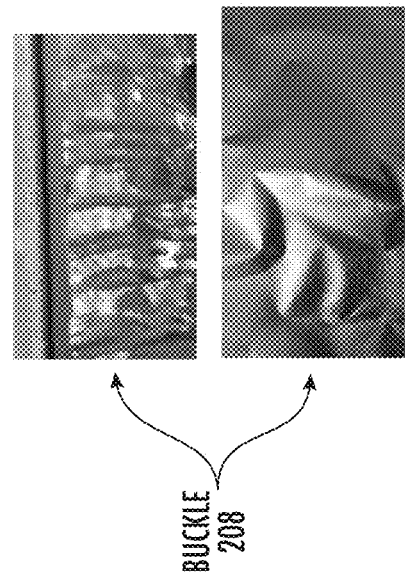
FIG. 1C illustrates example damages to a surface as in accordance with the prior art.
Figure 1C:
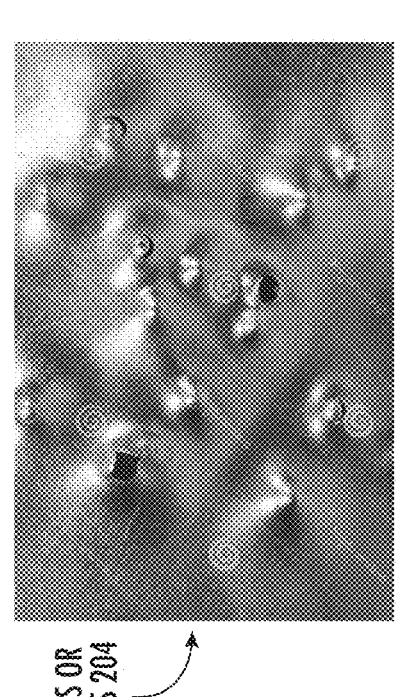

Referring now to FIG. 1A, FIG. 1B, and FIG. 1C a schematic diagram illustrating an electric vehicle battery and bottom cover is provided in accordance with the prior art. As used in various embodiments herein, an electric vehicle 120 may include a cell to chassis battery pack and/or a battery cell structure 102. In various embodiments, the battery cell structure may for example include a honeycomb structure as for example shown in the battery cell structure 102. In various embodiments, a bottom cover 104 is mechanically coupled to the battery cell structure directly or indirectly. The bottom cover 104 may also be part of the battery structure. In various embodiments, the bottom cover is configured to protect the battery. In various embodiments, the battery cell structure and the bottom cover form a chassis of the electric vehicle.

In various embodiments, the bottom cover 104 is located at a bottom of the electric vehicle and is configured to protect the battery from outside hazards such as rocks or other debris from the road and/or any other objects. The bottom cover 104 may be damaged in circumstances where the electric vehicle is involved in a collision, or when objects strike the bottom cover. As a result of the damage to the bottom cover 125, deformation including but not limited to any of dents or holes 204, buckle 208, etc. may appear on the surface 106 of the bottom cover 104.

In various embodiments, collision, impact by other objects, and/or forces from any direction, such as from the z direction 125, from the front direction 126 of the vehicle in the x-y plane, from the rear direction 127 of the vehicle in the x-y plane and/or any combination thereof, or any direction in the x, y, z dimensions may cause deformation on the surface 106.

The driver or other occupants of the vehicle may not realize occurrence of a deformation on the surface 106. For example, the impact by objects striking the bottom cover 104 may not be noticed by a driver or occupants of the vehicle, or a deformation caused by such may go unnoticed. However, the deformation may squeeze one or more battery cells, which could lead to some potential risks such as a thermal runaway which may put the vehicle and/or the occupants in danger of fire and/or smoke. A thermal runaway may be caused by a chain reaction causing heat and/or fire starting at one battery cell spreading rapidly to the other battery cells. For example, the thermal runaway may occur when the heat release rate from the chain reaction is larger than the cooling rate of the battery. When thermal runaway occurs, the battery may rapidly release large amount of heat and/or release flammable and/or toxic materials. It is therefore desirable to prevent thermal runaway and detect any condition that may trigger thermal runaway at an early stage.

The deformation may also damage the cooling system and/or any other supporting systems of the battery. It is therefore desirable to monitor the surface 106 and detect any deformation when it occurs.

Various embodiments of the present disclosure provide for monitoring the surface 106 continuously or at various time intervals. Various embodiments of the present disclosure provide for amplification of a deformation on the surface 106, for example for a more accurate and reliable detection of the deformation. Various embodiments of the present disclosure provide early warning of a deformation for example before the deformation causes any or any significant damage to the battery and/or before it results in any hazardous condition.

Figure 2:
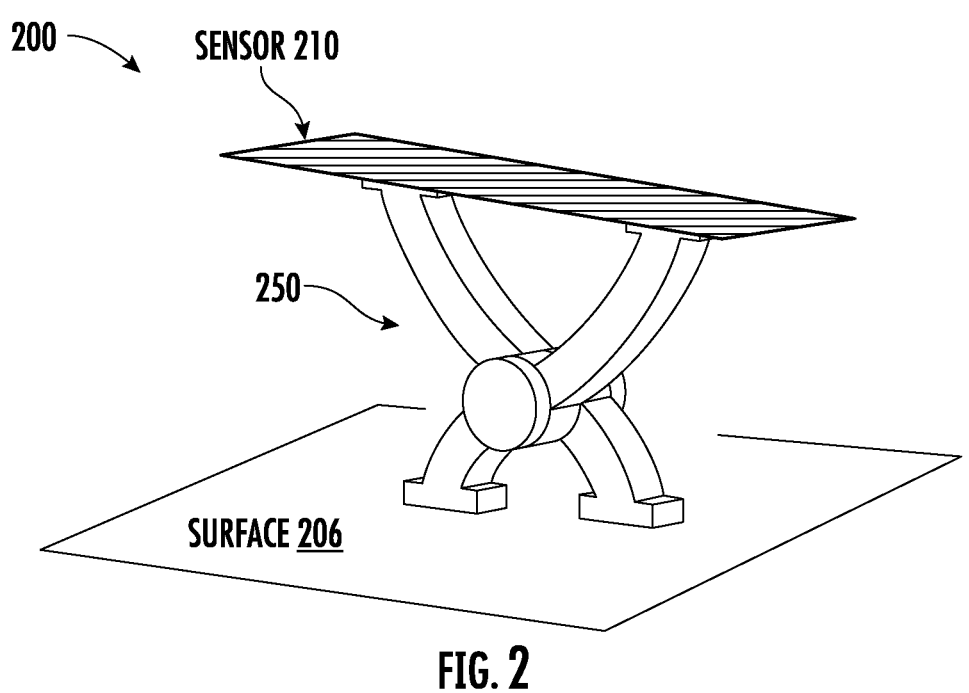
FIG. 2 is a schematic diagram illustrating a sensor device in accordance with various embodiments of the present disclosure.

Referring now to FIG. 2, a schematic diagram illustrating various aspects of a sensing device 200 is illustrated in accordance with various embodiments of the present disclosure. In various embodiments, the sensing device 200 includes a supporting unit 250 and a sensor 210 mechanically coupled to the supporting unit 250. In various embodiments, the supporting unit is mechanically coupled to a surface 206. In example embodiments, the surface 206 is the surface of a bottom cover of an electric vehicle facing the battery. In example embodiments, the surface 206 is any surface requiring monitoring such as but not limited to a surface on the bottom cover of an electric vehicle, or other surfaces of vehicles, containers, airplanes, ships, and/or building structures, foundations, etc.

In various embodiments, when a deformation occurs on the surface 206, the support unit 250 is configured to transfer a movement generated by the deformation on the surface 206 to the sensor 210. In various embodiments, the sensor 210 is configured to detect the movement transferred to it by the support unit 250. In various embodiments, the support unit 250 amplifies the movement caused by the deformation on the surface 206 and transfers the amplified movement to the sensor 210.

Figure 3A:
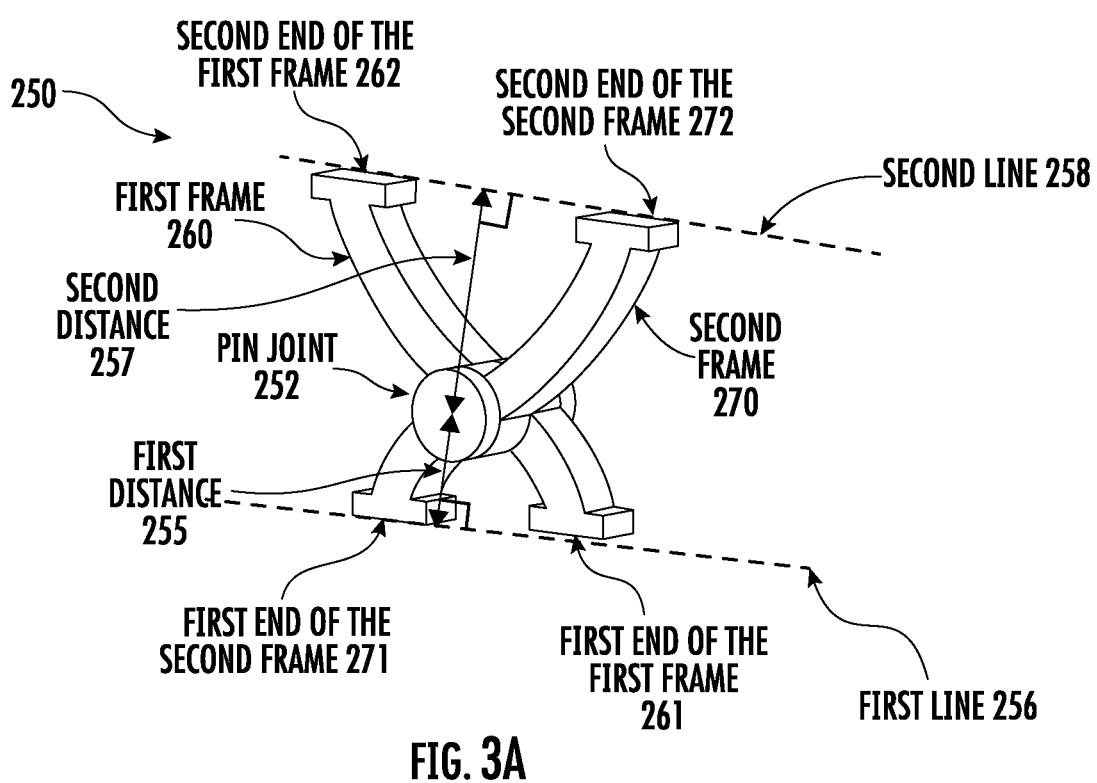
FIG. 3A is a schematic diagram illustrating a support unit in accordance with various embodiments of the present disclosure.

Referring now to FIG. 3A a schematic diagram illustrating the support unit 250 is provided in accordance with various embodiments of the present disclosure. In various embodiments, the support unit 250 includes a first frame 260 and a second frame 270. The first frame may include a first end of the first frame 261 and the second end of the first frame 262. The second frame may include the first end of the second frame 271 and the second end of the second frame 272. In various embodiments, the first end of the first frame 261 and the first end of the second frame 271 are configured to mechanically couple to a surface, for example surface 206 with reference to FIG. 2.

In various embodiments, the support unit 250 includes a pin joint 252 configured to mechanically couple the first frame 260 to the second frame 270 such that a first relative movement between the first end of the first frame 261 and the first end of the second frame 271 is amplified to a second relative movement between the second end of the first frame 262 and the second end of the second frame 272. In various embodiments, the first frame crosses the second frame at the pin joint and the first and second frames are each configured to pivot independently around the pin joint for example in a scissors-like movement.

In various embodiments, a first distance 255 is a distance between the pin joint 252 and a first line 256 passing through the first end of the first frame 261 and the first end of the second frame 271. In various embodiments, the distance is measured as a length of a line perpendicular to the first line 256 and connecting a center of the pin joint 252 with the first line 256.

In various embodiments, a second distance 257 is a distance between the pin joint 252 and a second line 258 passing through the second end of the first frame 262 and the second end of the second frame 272. In various embodiments, the distance is measured as a length of a line perpendicular to the second line 258 and connecting a center of the pin joint 252 with the second line 258.

In various embodiments, the first distance 255 is less than the second distance 257. In various embodiments, the support unit 250 amplifies the first relative movement between the first ends of the first and second frames proportional to a ratio of the second distance 257 to the first distance 255. For example, if the second distance 257 is N times the first distance 252, the second relative movement is N times the first relative movement.

In example embodiments, N may have any real or integer values. In example embodiments, 1<N<15. In example embodiments, 1<N<12. In example embodiments, 1<N<10. In example embodiments, 2<N<10. In example embodiments, 3<N<10. Various embodiments herein are not limited to any of the values described herein and any other values may be used.

In various embodiments, the first relative movement may for example be caused by a deformation of the surface where the first ends of the first and second frames are mechanically coupled to. As previously described, the surface may be on a bottom cover of an electric vehicle facing a battery of the electric vehicle. In various embodiments, the battery may include a battery cell structure, where the battery cell structure and the bottom cover form a chassis of the electric vehicle.

In various embodiments, with reference to FIG. 2, the sensor 210 is mechanically coupled to the second end of the first frame 262 and the second end of the second frame 272. The sensor may be mechanically coupled to the second ends of the frames. In various embodiments, the sensor 210 is configured to sense the second relative movement between the second end of the first frame 262 and the second end of the second frame 272. In various embodiments, the sensor 210 may be a strain gauge sensor where one or more of its electrical properties may vary as a result of a strain or compression imposed on the sensor due to the second relative movement. For example, the sensor 210 may include any of a resistive, capacitive, and/or inductive strain gauge sensor and/or any combination thereof.

In various embodiments, the first frame 260 and the second frame 270 are made from rigid materials such as metal, hard plastic, Acrylonitrile Butadiene Styrene (ABS), and/or any thermoplastic polymer, etc. In various embodiments, the first frame 260 and the second frame 270 may have any geometrical shapes. In various embodiments, the first frame 260 and the second frame 270 may have similar or different shapes. For example, the first and/or second frame may have linear shapes. For example, any of the first and/or second frames may have curved shapes. For example, a first part of the first frame from the first end of the first frame to the pin joint may have a convex shape and a second part of the first frame form the pin joint to the second end of the first frame may have a concave shape as for example shown in FIG. 3A. For example, a first part of the second frame from the first end of the second frame to the pin joint may have a convex shape and a second part of the first frame form the pin joint to the second end of the second frame may have a concave shape as for example shown in FIG. 3A. The first and second frame may have various other shapes and combinations thereof.

Figures 3B, 3C:
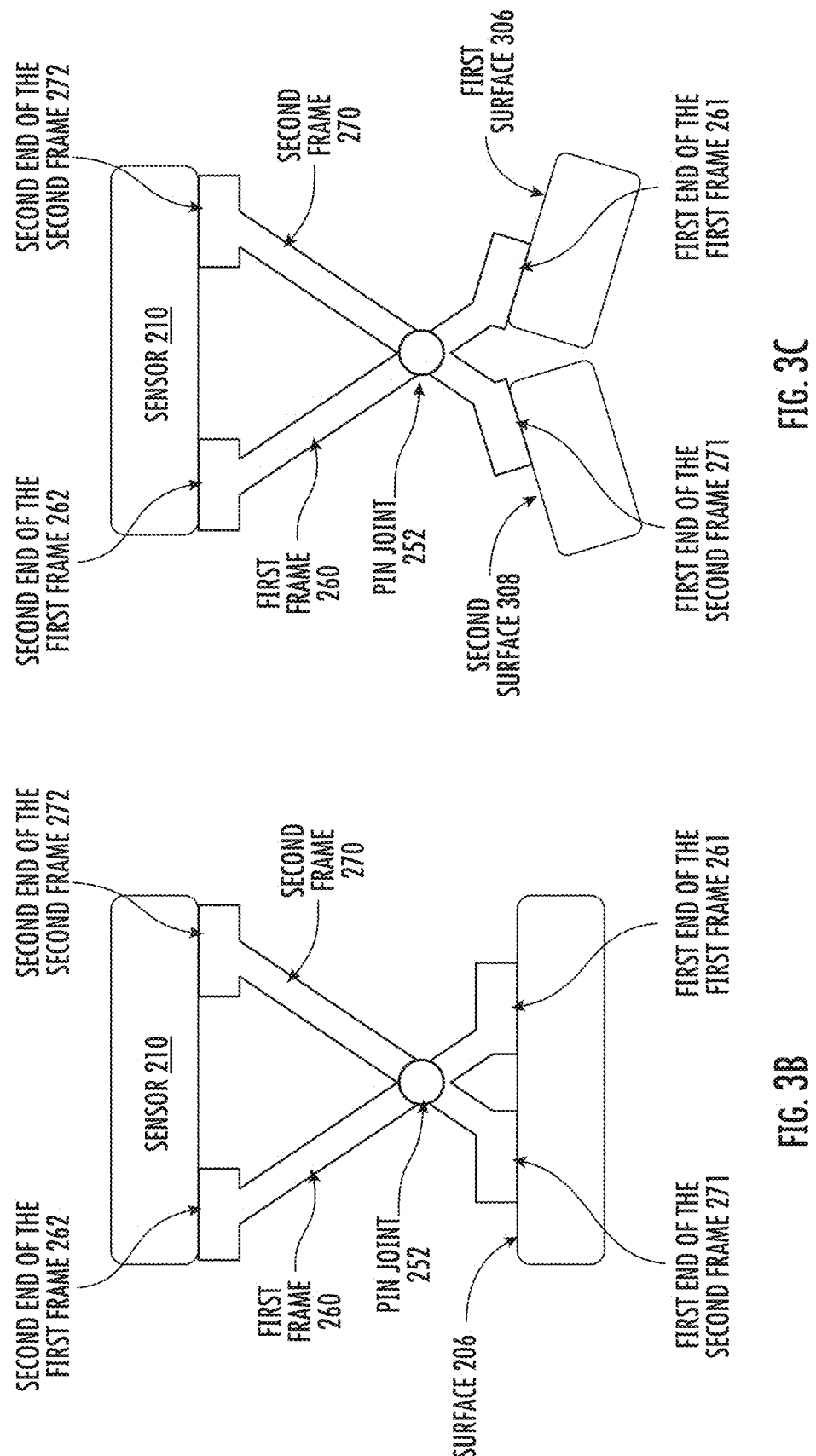
FIG. 3B is a schematic diagram illustrating a support unit in accordance with various embodiments of the present disclosure.
FIG. 3C is a schematic diagram illustrating a support unit in accordance with various embodiments of the present disclosure.

Referring now to FIG. 3B a schematic diagram illustrating the support unit is provided in accordance with various embodiments of the present disclosure. In various embodiments, the surface 206 includes an approximately flat surface area where the first end of the first frame 261 and the first and of the second frame 271 are mechanically coupled. In various embodiments, the first frame and the second frame may include a linear shape as for example illustrated by FIG. 3B. In various embodiments, as previously described, the first and second frames may include any other shape(s).

Referring now to FIG. 3C a schematic diagram illustrating the support unit is provided in accordance with various embodiments of the present disclosure. In various embodiments, the first end of the first frame 261 is mechanically coupled to a first surface 306 and and the first and of the second frame 271 is mechanically coupled to a second surface 308. In example embodiments, first surface 306 and the second surface 308 are in different planes with respect to each other. In various examples, the first and second surfaces may be in two different intersecting planes as for example illustrated in FIG. 3C. In example embodiments, the first and second surfaces are in parallel planes that are offset with respect to each other.

In example embodiments, the first and second surfaces are surfaces of two different components that are mechanically coupled to each other. In example embodiments, the first and second surfaces are two facets of the same component. For example, the first and second surfaces are surfaces around a joint, seam, edge, etc. In example embodiments, joints, seams, edges, etc. may be more vulnerable to movements, breaks, and/or deformation. In various embodiments, the support unit is used to monitor various surfaces for example surrounding a joint, seam, edge, etc., to detect relative movements and/or deformations.

In various embodiments, the pin joint 252 is placed closer to a first line passing through the first ends of the frames than a second line passing through the second ends of the frames as for example described above. In various embodiments, the pin joint 252 is placed closer to the first end of the first frame than the second end of the first frame, and/or closer to the first end of the second frame than the second end of the second frame.

Figure 4A:
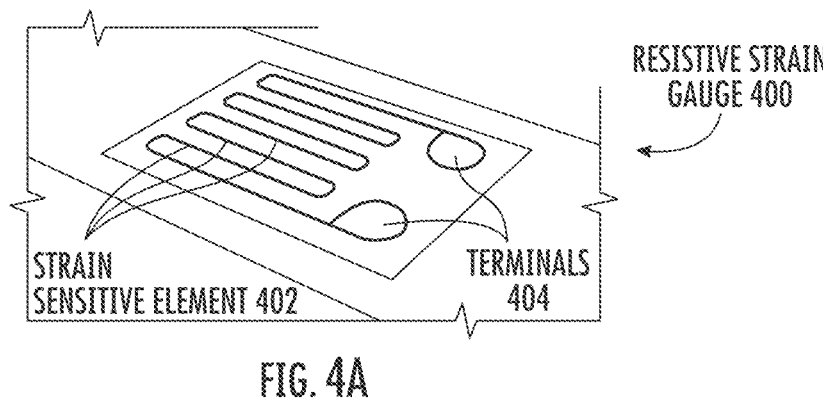
FIG. 4A is a schematic diagram illustrating a resistive strain gauge in accordance with various embodiments of the present disclosure.
Figure 4B:
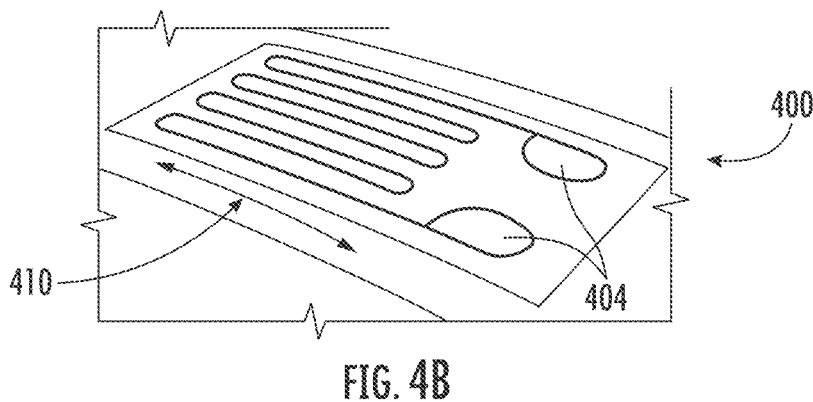
FIG. 4B is a schematic diagram illustrating a resistive strain gauge in accordance with various embodiments of the present disclosure.
Figure 4C:
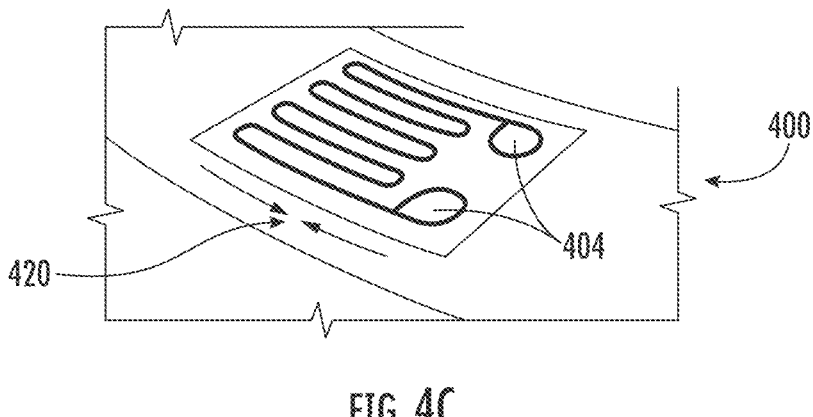
FIG. 4C is a schematic diagram illustrating a resistive strain gauge in accordance with various embodiments of the present disclosure.

Referring now to FIGS. 4A-4C a schematic diagram illustrating a resistive strain gauge 400 is provided in accordance with various embodiments of the present disclosure. In various embodiments, a resistance of the resistive strain gauge 400 varies when it is stretched and/or compressed. In various embodiments, the resistive strain gauge 400 includes a resistive strain sensitive element 402. The resistance of the resistive strain sensitive element 402 is changed when the resistive strain gauge 400 is stretched for example as shown in FIG. 4C and/or compressed for example as shown in FIG. 4C. In various embodiments, the resistive strain sensitive element 402 may include conductive material where a cross section area of parts or all of the resistive strain sensitive element 402 and consequently its resistance as measured at the terminals 404 changes due to a tension and/or a movement causing stretch 410 or compression 420 on the sensor.

For example, as a result of the stretch 410 the cross-section area of part or all of the resistive strain sensitive element 402 decreases and the resistance of the resistive strain sensitive element 402 increases. For example, as a result of the compression 420 the cross-section area of part or all of the resistive strain sensitive element 402 increases and the resistance of the resistive strain sensitive element 402 decreases.

In various embodiments, the resistance between the terminals 404 changes due to and proportional to a tension causing any combination of stretch and/or compression on various parts of the resistive strain sensitive element 402. In various embodiments, the tension on the resistive strain gauge 400 causes the resistance between the terminals 404 to change.

In various embodiments, the tension on the resistive strain gauge 400 is due to and proportional to the second relative movement. The change in resistance between the terminals 404 may therefore be used to determine the presence of the second relative movement because the change in the resistance is proportional to the second relative movement. In various embodiments, the second relative movement is due to a deformation on the surface 206. In various embodiments, a second relative movement lager than a movement threshold is an indication of a deformation on the surface 206. In various embodiments, the deformation on the surface 206 is detected when the resistance is outside a normal resistance range, which implies that the second relative movement is larger than the movement threshold.

Figure 5:
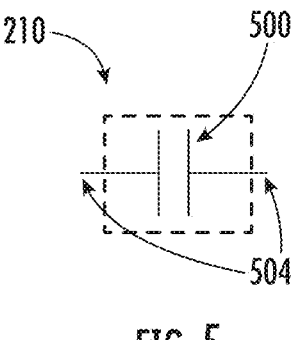
FIG. 5 is a schematic diagram illustrating a capacitive strain gauge in accordance with various embodiments of the present disclosure.

Referring now to FIG. 5 a schematic diagram illustrating the sensor 210 is provided in accordance with various embodiments of the present disclosure. In various embodiments, the sensor 210 comprises a capacitive strain gauge. In various embodiments, a capacitance of the strain gauge sensor varies due to and proportional to the second relative movement. The second relative movement may cause a strain on the sensor 210 which may cause a stretch, a compression, and/or any combination of stretch and compression in various locations on the sensor 210.

In various embodiments, any of the stretch and/or compression causes plates of a capacitor 500 to move relative to each other, hence causing the capacitance of the capacitor 500 to vary. In various embodiments, the deformation is detected when the capacitance is outside a normal capacitance range.

Figure 6:
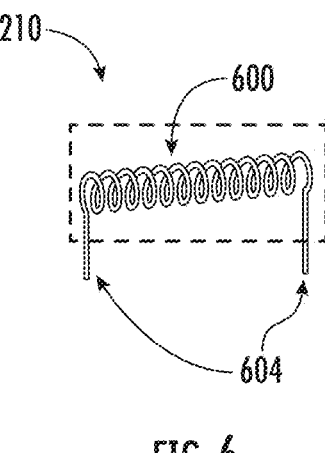
FIG. 6 is a schematic diagram illustrating an inductive strain gauge in accordance with various embodiments of the present disclosure.

Referring now to FIG. 6 a schematic diagram illustrating sensor 210 is provided in accordance with various embodiments of the present disclosure. In various embodiments, the sensor 210 comprises an inductive strain gauge. In various embodiments, an inductance of the strain gauge sensor varies due to and proportional to the second relative movement. The second relative movement may cause a strain on the sensor 210 which may cause a stretch, a compression, and/or any combination of stretch and compression in various locations on the sensor 210.

In various embodiments, any of the stretch and/or compression causes loops of an inductor 500 to move relative to each other, hence causing the inductance of the inductor 500 to vary. In various embodiments, the deformation is detected when the inductance is outside a normal inductance range.

In various embodiments, the sensor 210 may include a stain gauge including any combination of the resistive, capacitive and/or inductive strain gauges.

Figure 7:
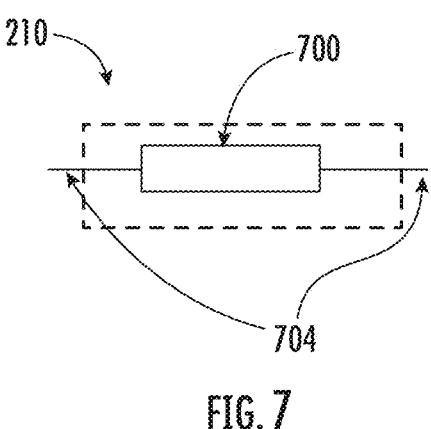
FIG. 7 is a schematic diagram illustrating a piezo electric element in accordance with various embodiments of the present disclosure.

Referring now to FIG. 7 a schematic diagram illustrating sensor 210 is provided in accordance with various embodiments of the present disclosure. In various embodiments, the sensor 210 comprises a piezoelectric material 700. The second relative movement may cause a strain on the sensor 210 which may cause a stretch, a compression, and/or any combination of stretch and compression in various locations on the piezoelectric material 700. The piezoelectric material may produce a voltage as a result of and proportional to the stretch, compression, and/or any combination of stretch and compression in various locations on it.

In various embodiments, the second relative movement causes the strain on the sensor 210, consequently the piezoelectric material generates a voltage due to and proportional to the second relative movement. In various embodiments, the deformation is detected when the voltage is outside a normal voltage range.

Figure 8:
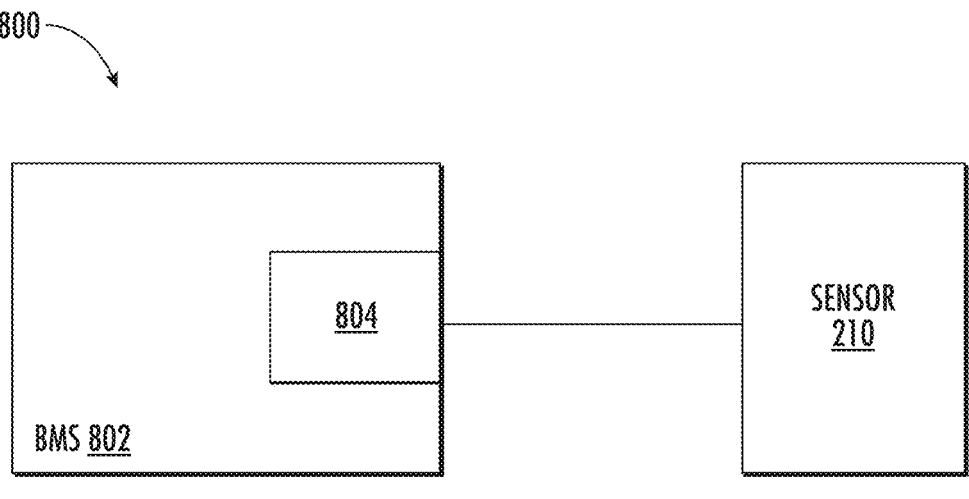
FIG. 8 is a schematic diagram illustrating a system in accordance with various embodiments of the present disclosure.

Referring now to FIG. 8 a schematic diagram illustrating a system 800 for communicating with the sensor is provided in accordance with various embodiments of the present disclosure.

In various embodiments, the electric vehicle may include a Battery Management System (BMS) 802. In various embodiments, the BMS 802 may be part of or electronically coupled to a Vehicle Control Unit (VCU). The BMS 802 may include a detection module 804. The detection module 804 communicates with the sensor 210 to determine a variation in the electrical property of an electrical component of the sensor 210.

In various embodiments, the detection module 804 includes a voltmeter configured to determine the voltage generated by the piezoelectric material of the sensor 210.

In various embodiments, the detection module 804 includes a resistance meter configured to determine a resistance of the resistive strain gauge of the sensor 210. For example, the module 804 may include a current source to generate a current that passes through the resistive strain gauge and a voltage meter configured to determine the resulting voltage. In various embodiments, a voltage source may be applied a voltage to the resistive strain gauge and the resulting current may be measured. In various embodiments, the resistance of the resistive strain gauge is determined using the ratio of the voltage to current. In various examples, the current may be direct current (DC) or alternating current (AC).

In various embodiments, the detection module 804 includes a capacitance meter configured to determine a capacitance of the capacitive strain gauge of the sensor 210. For example, the module 804 may include a current source to generate a current that passes through the capacitive strain gauge and a voltage meter configured to determine the resulting voltage. In various embodiments, the capacitance of the capacitive strain gauge is determined using a ratio of the measured voltage change rate to the applied current.

In various embodiments, the detection module 804 includes a capacitance meter configured to determine a capacitance of the capacitive strain gauge of the sensor 210. For example, the module 804 may include a varying current source to generate a current that passes through the capacitive strain gauge and a voltage meter configured to determine the resulting voltage. In various embodiments, the capacitance of the capacitive strain gauge is determined using a ratio of the measured voltage change rate to the applied current.

In various embodiments, the detection module 804 includes an inductance meter configured to determine an inductance of the indictive strain gauge of the sensor 210. For example, the module 804 may include a varying voltage source to generate a voltage that is applied to the inductive strain gauge and a current meter configured to determine the resulting current. In various embodiments, the inductance of the inductive strain gauge is determined using a ratio of the measured current change rate to the applied voltage.

In various embodiments, the BMS 802 may detect the deformation using any of the voltage generated by the piezoelectric material, resistance value of the resistive strain gauge, capacitance of the capacitive strain gauge, and inductance of the inductive strain gauge, and/or any combination of the above when the senor 210 includes two or more of the strain gauges described herein. In various embodiments, the BMS 802 provides appropriate outputs, such as warning on a display of the vehicle and/or communicate with emergency services when a deformation is detected on the bottom cover of the vehicle, for example the bottom cover 104.

In various embodiments, a deformation may cause the frames of a support unit to break, and or any of the sensor 210 (which may include any of or any combination of the types of sensors described above) to break or malfunction. In various embodiments, when the sensor 210 does not operate as intended, the BMS 802 determines that there is a deformation cause the malfunction.

Figure 9:
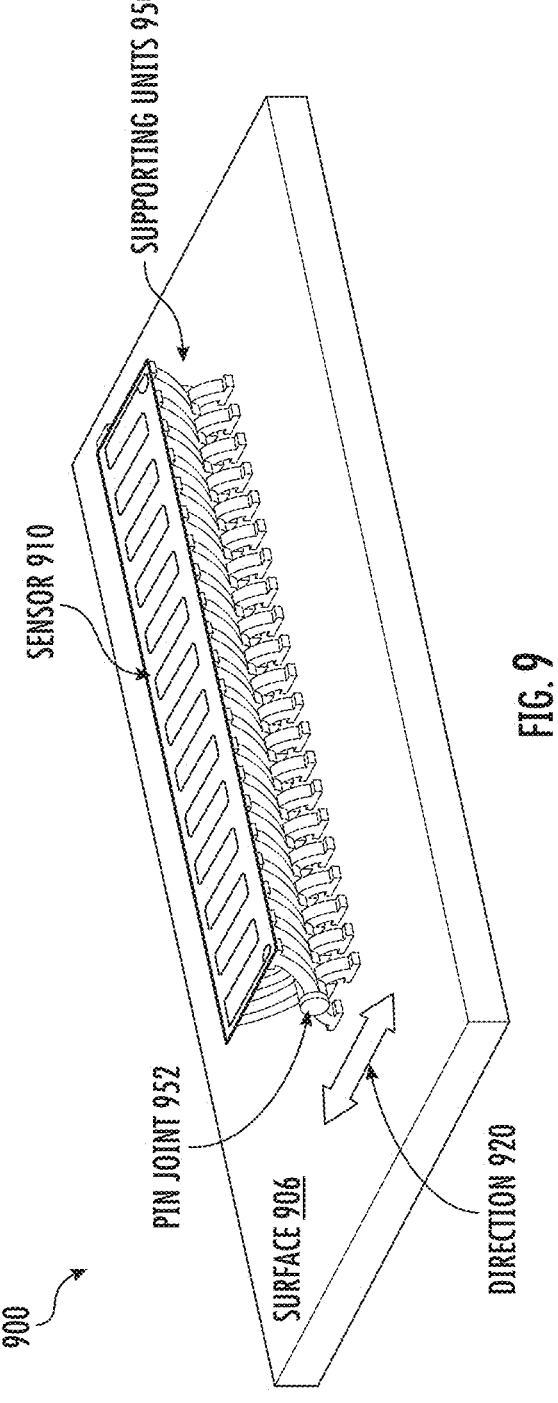
FIG. 9 is a schematic diagram illustrating a sensing system in accordance with various embodiments of the present disclosure.

Referring now to FIG. 9, a schematic diagram illustrating various aspects of a sensing system 900 is provided in accordance with various embodiments of the present disclosure. In various embodiments, the sensing system 900 includes two or more support units 950. In various embodiments, each support unit of the support units 950 include a first frame and a second frame similar to the support unit 250 described above for example with reference to FIGS. 3A-3C. In various embodiments, a first end of each first frame and a first end of each second frame of the support units are configured to mechanically couple to a surface 906. In example embodiments, the surface 906 is a surface of a bottom cover 104 of an electric vehicle facing the battery pack of the vehicle.

In various embodiments, a pin joint 952 is configured to mechanically couple each first frame to each corresponding second frame of the support units 950. In various embodiments, the pin joint 952 is configured to mechanically couple each first frame to each corresponding second frame such that a first relative movement between the first end of the first frame and the first end of the corresponding second frame is amplified to a second relative movement between a second end of the first frame and a second end of the corresponding second frame for example in a similar way as described with reference to FIGS. 3A-3C. In various embodiments, the pin joint 952 is shared among the support units 950. In various embodiments, the support units 950 share an axle where each first frame and the corresponding second frame of the support units cross each other. In various embodiments, each supporting unit has its own pin joint, where the pin joints of any two adjacent supporting units of the supporting units 950 are mechanically coupled to each other.

In various embodiments, a sensor 910 is mechanically coupled to second ends of the first frames and second ends of the second frames of the support units 950. In various embodiments, the sensor 910 is configured to sense the second relative movement between the second ends of any of the supporting units. In example embodiments, the sensor 910 is configured to detect deformation in a plane perpendicular to the surface 906 and parallel to the direction 920. For example, the deformation may be any of a stretch, tear, hole, and/or opening, etc. in the direction 920 on the surface 952, or any of a dent, buckle, bent, etc. in a plane perpendicular to the surface 906 and in the direction 920. In example embodiments, when the deformation moves first ends of one or more pair of corresponding first, and second frames of the supporting units 950. Any deformation that moves any pair of first ends and is amplified to a second relative movement between a pair of second ends may be sensed by the sensor 910.

In various embodiments, the sensor 910 includes an electrical component configured to have a variable electrical property as a result of the second relative movement. For example, similar to and with reference to FIGS. 4-7, the sensor 910 may include any of the resistive, capacitive, and/or inductive strain gauge sensors. In various embodiments, the sensor 910 may include a piezoelectric material. In various embodiments, the sensor 910 may be similar to, share, and/or include any features or components of sensor 210 as described above.

In various embodiments, the sensing system may include a control unit such as the BMS 802 with reference to FIG. 8 configured to determine a deformation of the surface 906 using an amount of variation in the electrical property of the sensor 910. In various embodiments, the sensor 910 may be used similar to the senor 210 in the system 800.

Figure 10:
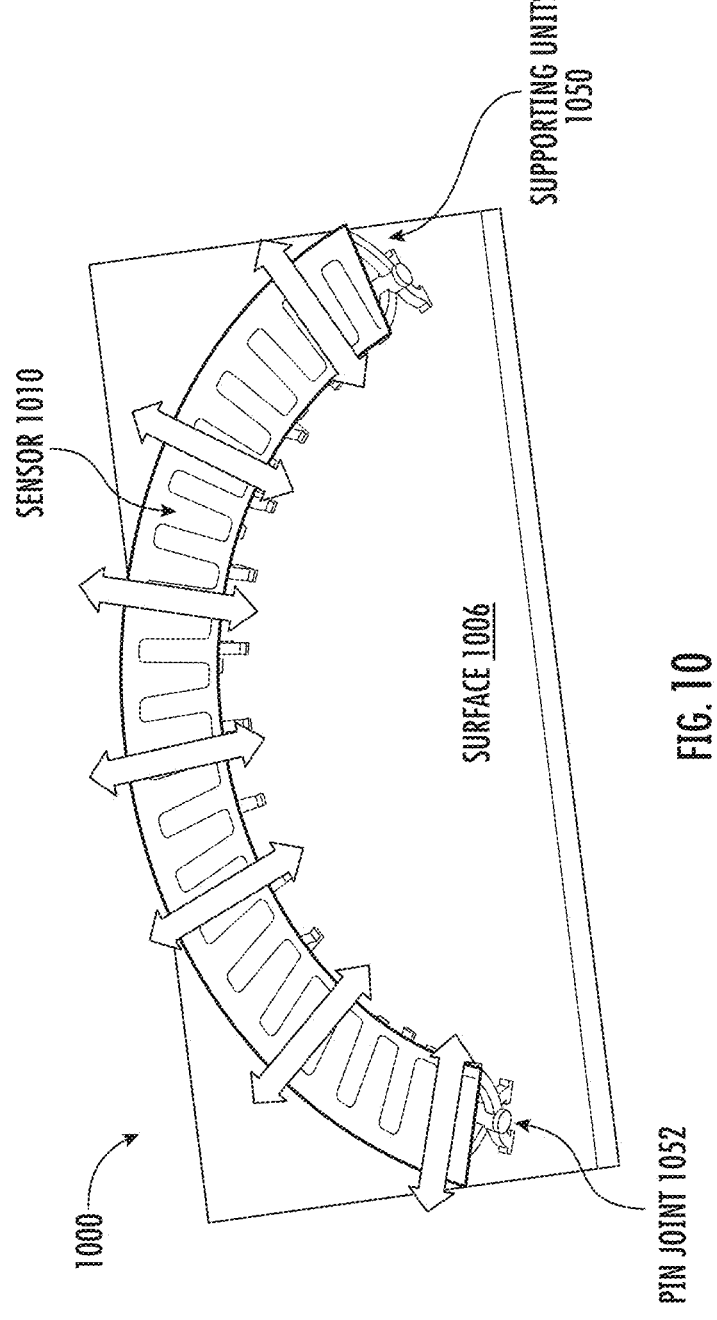
FIG. 10 is a schematic diagram illustrating a sensing system in accordance with various embodiments of the present disclosure.

Referring now to FIG. 10 a schematic diagram illustrating various aspects of a sensing system 1000 is provided in accordance with various embodiments of the present disclosure. In various embodiments, two or more supporting units 1050 may be placed adjacent to each other. In various embodiments, each of the supporting units 1050 is similar to the supporting unit 250 illustrated with reference to FIG. 3A-3C. In various embodiments, first ends of the supporting units are mechanically coupled to a surface 1006 which may be a surface of a bottom cover of an electric vehicle. In various embodiments, a sensor 1010 is mechanically coupled to the second ends of the supporting unit.

In various embodiments, the supporting units are placed next to each other such that they form a curved arrangement. In various embodiments, the supporting units may form any linear, curved, zigzag, and/or any combination thereof, etc. arrangement. In various embodiments, the support units may detect deformations in the direction of the double-sided arrows shown in FIG. 10 or in a plane perpendicular to the surface 1006 and parallel to the double-sided arrows.

In example embodiments, arranging the supporting units in various shapes other than and/or in addition to a straight line provides for detection of deformations in different and more diverse directions.

Figure 11:
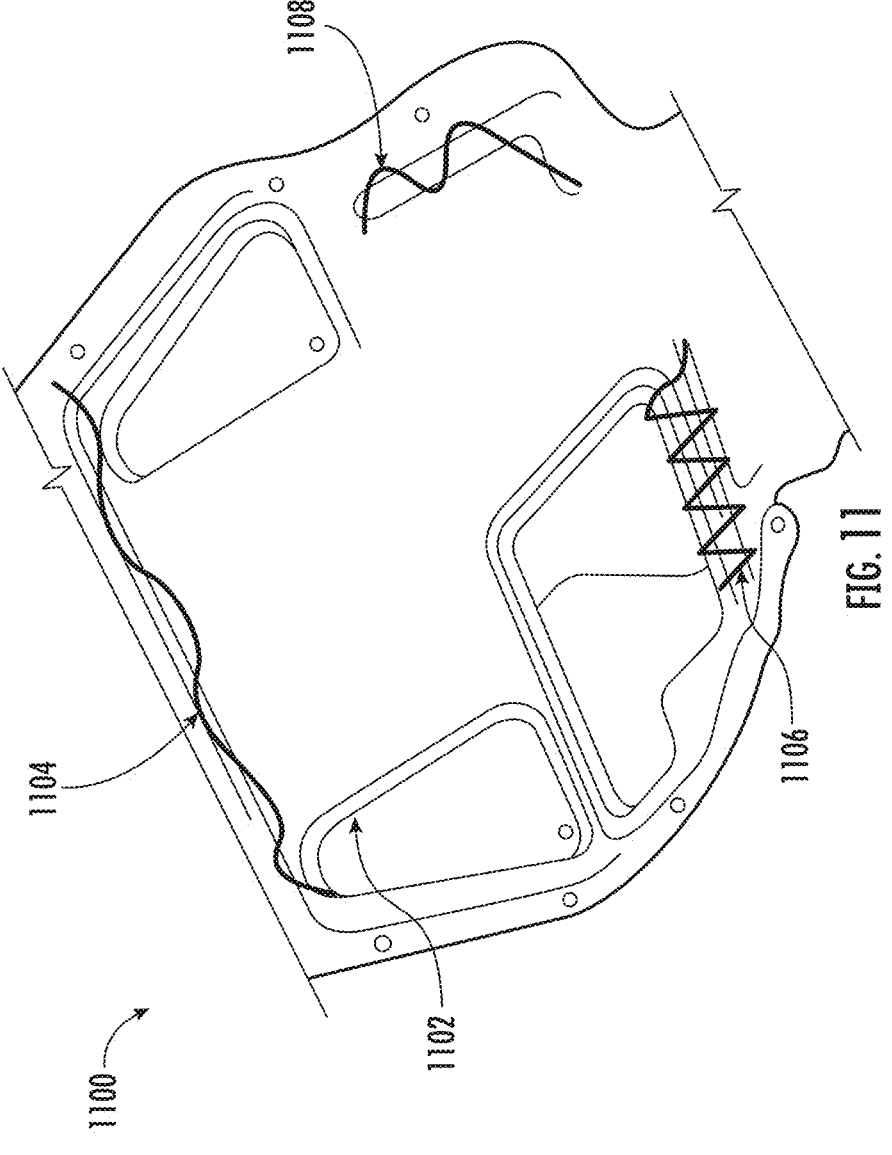
FIG. 11 is a schematic diagram illustrating a sensing system installed on a bottom cover of a vehicle in accordance with various embodiments of the present disclosure.

Referring now to FIG. 11 a schematic diagram illustrating various aspects of a bottom cover 1100 of an electric vehicle is provided in accordance with various embodiments of the present disclosure. In various embodiments, the bottom cover 1100 includes various slots 1102. In various embodiments, the location of various slots and/or other variation in a surface of the bottom cover 1102 may result in different need for monitoring for deformation in different locations on the bottom cover 1100. In various embodiments, different directions on the bottom cover 1100 may require closer monitoring for deformation than other directions.

In example embodiments, various arrangements and shapes of the sensing system 1000, such as arrangements

1102, 1106, 1108 provide for required monitoring in different areas and different directions on the bottom cover 1100.

In various embodiments, the sensor systems for example sensing systems 900, 1000 described herein may be located on any other surfaces and/or types of surfaces where detecting a deformation is desired.

Figure 12:
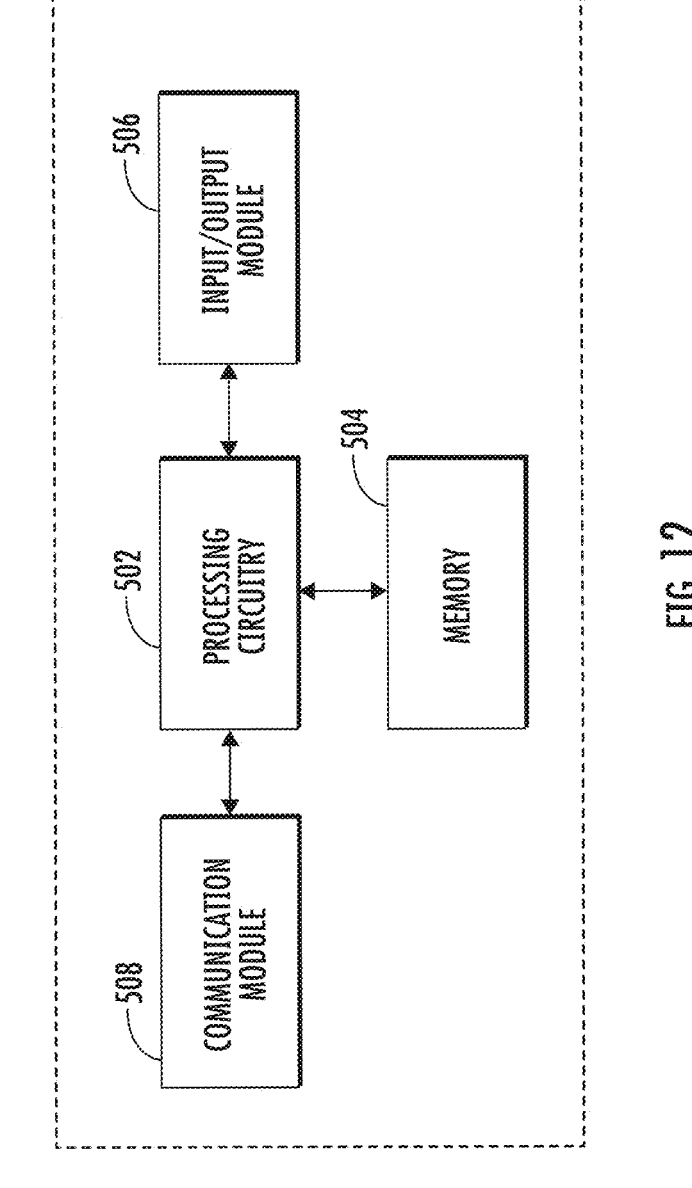
FIG. 12 is a schematic diagram illustrating a controller in accordance with various embodiments of the present disclosure.

Referring now to FIG. 12, a schematic diagram depicting an example controller 212 of an example apparatus in electronic communication with various other components in accordance with various embodiments of the present disclosure is provided. For example, as described herein, the controller 212 may be in electronic communications with any of the sensor devices and/or with the BMS or VCU. In various embodiments, any of the BMS or the VCU may include the controller 212. As shown, the controller 212 comprises processing circuitry 502, a communication module 508, input/output module 506, a memory 504 and/or other components configured to perform various operations, procedures, functions or the like described herein.

In various embodiments, the controller 212 (such as the processing circuitry 502, communication module 508, input/output module 506 and memory 504) is electrically coupled to and/or in electronic communication with the sensors, detection module, BMS, and/or VCU. In various embodiments, any of the sensors, detection module, BMS, and/or VCU may exchange (e.g., transmit and receive) data with the processing circuitry 502 of the controller 212.

The processing circuitry 502 may be implemented as, for example, various devices comprising one or a plurality of microprocessors with accompanying digital signal processors; one or a plurality of processors without accompanying digital signal processors; one or a plurality of coprocessors; one or a plurality of multi-core processors; one or a plurality of controllers; processing circuits; one or a plurality of computers; and various other processing elements (including integrated circuits, such as ASICs or FPGAs, or a certain combination thereof). In some embodiments, the processing circuitry 502 may comprise one or more processors. In one exemplary embodiment, the processing circuitry 502 is configured to execute instructions stored in the memory 504 or otherwise accessible by the processing circuitry 502. When executed by the processing circuitry 502, these instructions may enable the controller 212 to execute one or a plurality of the functions as described herein. No matter whether it is configured by hardware, firmware/software methods, or a combination thereof, the processing circuitry 502 may comprise entities capable of executing operations according to the embodiments of the present invention when correspondingly configured. Therefore, for example, when the processing circuitry 502 is implemented as an ASIC, an FPGA, or the like, the processing circuitry 502 may comprise specially configured hardware for implementing one or a plurality of operations described herein. Alternatively, as another example, when the processing circuitry 502 is implemented as an actuator of instructions (such as those that may be stored in the memory 504), the instructions may specifically configure the processing circuitry 502 to execute one or a plurality of methods, algorithms and operations described herein, such as those discussed with reference to any of the figures herein.

The memory 504 may comprise, for example, a volatile memory, a non-volatile memory, or a certain combination thereof. Although illustrated as a single memory in FIG. 5, the memory 504 may comprise a plurality of memory components. In various embodiments, the memory 504 may comprise, for example, a hard disk drive, a random access memory, a cache memory, a flash memory, a Compact Disc Read-Only Memory (CD-ROM), a Digital Versatile Disk Read-Only Memory (DVD-ROM), an optical disk, a circuit configured to store information, or a certain combination thereof. The memory 504 may be configured to store information, data, application programs, instructions, and etc., so that the controller 212 can execute various functions according to the embodiments of the present disclosure. For example, in at least some embodiments, the memory 504 is configured to cache input data for processing by the processing circuitry 502. Additionally or alternatively, in at least some embodiments, the memory 504 is configured to store program instructions for execution by the processing circuitry 502. The memory 504 may store information in the form of static and/or dynamic information. When the functions are executed, the stored information may be stored and/or used by the controller 212.

The communication module 508 may be implemented as any apparatus included in a circuit, hardware, a computer program product or a combination thereof, which is configured to receive and/or transmit data from/to another component or apparatus. The computer program product comprises computer-readable program instructions stored on a computer-readable medium (for example, the memory 504) and executed by a controller 212 (for example, the processing circuitry 502). In some embodiments, the communication module 508 (as with other components discussed herein) may be at least partially implemented as the processing circuitry 502 or otherwise controlled by the processing circuitry 502. In this regard, the communication module 508 may communicate with the processing circuitry 502, for example, through a bus. The communication module 508 may comprise, for example, antennas, transmitters, receivers, transceivers, network interface cards and/or supporting hardware and/or firmware/software, and is used for establishing communication with another apparatus. The communication module 508 may be configured to receive and/or transmit any data that may be stored by the memory 504 by using any protocol that can be used for communication between apparatuses. The communication module 508 may additionally or alternatively communicate with the memory 504, the input/output module 506 and/or any other component of the controller 212, for example, through a bus.

In some embodiments, the controller 212 may comprise an input/output module 506. The input/output module 506 may communicate with the processing circuitry 502 to receive instructions input by the user and/or to provide audible, visual, mechanical or other outputs to the user. Therefore, the input/output module 506 may be in electronic communication with supporting devices, such as a keyboard, a mouse, a display, a touch screen display, and/or other input/output mechanisms. Alternatively, at least some aspects of the input/output module 506 may be implemented on a device used by the user to communicate with the controller 212. The input/output module 506 may communicate with the memory 504, the communication module 508 and/or any other component, for example, through a bus. One or a plurality of input/output modules and/or other components may be included in the controller 212.

In various embodiments, various steps of the methods herein may be performed by any of a BMS, VCU, detection module, and/or controller 212. As noted above the BMS, VCU, and/or the detection module may include the controller 212 described above in regard to FIG. 12 and may similarly comprise processing circuitry 502, a communication module 508, an input/output module 506 and a memory 504. In some examples, the memory of the controller may store computer program instructions.

Figure 13:
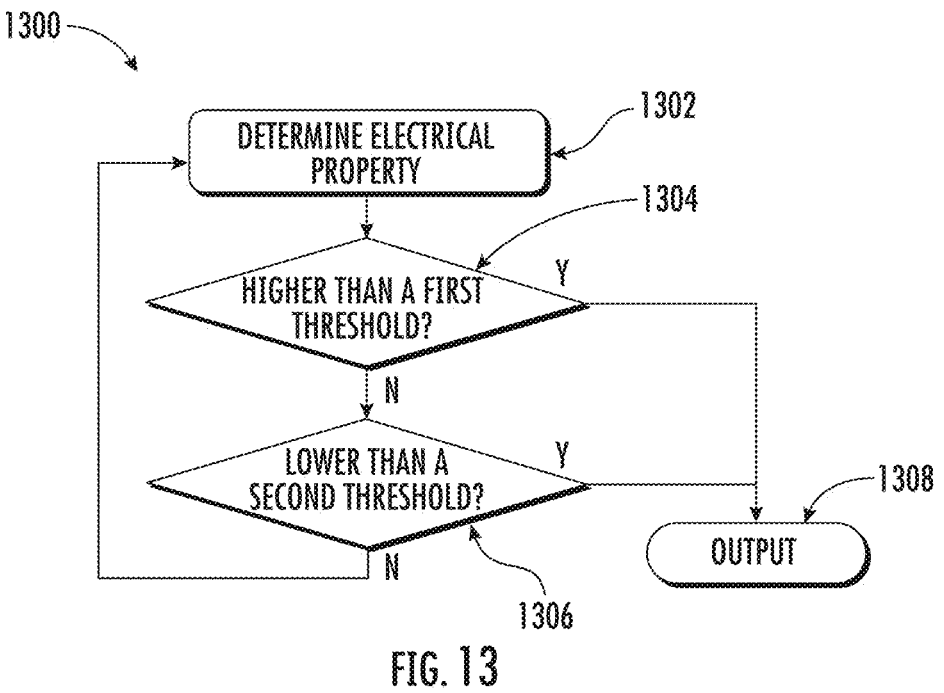
FIG. 13 is a flowchart illustrating a method in accordance with various embodiments of the present disclosure.

Referring now to FIG. 13, a flowchart diagram illustrating a method 1300 in accordance with various embodiments of the present disclosure is provided. In various embodiments, at step 1302, a controller (such as, but not limited to the controller 212 of any of the senor systems described herein) may determine an electrical property of an electrical component of the sensor. In various embodiments, the electrical property may be any of a resistance, capacitance, inductance, and/or generated voltage as described herein.

In various embodiments, at step 1304, the controller compares the electrical property with a first threshold. When the electrical property is greater than the first threshold, in various embodiments, the controller generates an output in step 1308. The output may be an alarm signal, warning signal, and/or any other signal generated for display of a warning generated on a display or for further examination. In various embodiments, the output may be sent to any of the BMS or VCU.

When the electrical property is not higher than the first threshold, in various embodiments, the controller compares the electrical property with a second threshold. When the electrical property is lower than the second threshold, in various embodiments, the controller generates the output in step 1308. When the electrical property is higher than the second threshold, in various embodiments, the controller continues to determine the electrical property at step 1302. In various embodiments, the second threshold is lower than the first threshold. In various embodiments, the determination of the electrical property occurs in real-time or continuously. In various embodiments, the determination of the electrical property occurs in various time intervals.

Referring now to FIG. 14 a flowchart illustrating a method 1400 is provided in accordance with various embodiments of the present disclosure. In various embodiments, at step 1402, the method 1400 amplifies a first relative movement between a first location and a second location on a surface. In various embodiments, a first frame and a second frame that are mechanically coupled to the first and second locations respectively and are mechanically coupled to each other at a pin joint are used to provide the amplification, for example as described above with reference to FIGS. 2-10.

In various embodiments, at step 1404, the method 1400 generates a second relative movement resulting from the amplification of the first relative movement by the support unit. For example, the second relative movement is generated between a second end of the first and second frames as described above with reference to FIGS. 2-10.

In various embodiments, at step 1406, the method 1400 varies an electrical property of an electrical component using the second relative movement. For example, any of the sensors described above, using any of the resistive, capacitive, and/or inductive strain gauge and/or piezoelectric element may be used to vary the electrical property.

In various embodiments, at step 1408, the method 1400 detects a deformation of the surface using an amount of variation in the electrical property. In various embodiments, a detection module as described above for example with reference to FIG. 8 determines the amount of variation of the electrical property. In various embodiments, the controller as described above detects the deformation using the variation in the electrical property.

In various embodiments, the surface is on a bottom cover of an electric vehicle facing a battery of the electric vehicle. In various embodiments, a deformation on any other surface may be determined using the devices, systems, and/or methods described herein.

In various embodiments, the battery comprises a battery cell structure, wherein the battery cell structure and the bottom cover form a chassis of the electric vehicle.

In various embodiments, the method 1400 may further includes generating an alarm and/or a visual indication when the deformation is detected. In various embodiments, any of BMS, VCU, and/or the controller as described above may generate the alarm and/or the visual indication.

In some examples, one or more of the procedures and/or methods described herein may be embodied by computer program instructions, which may be stored by a memory (such as a non-transitory memory) of a system employing an embodiment of the present disclosure and executed by a processing circuitry (such as a processor) of the system. These computer program instructions may direct the system to function in a particular manner, such that the instructions stored in the memory circuitry produce an article of manufacture, the execution of which implements the function specified in the flow diagram step/operation(s). Further, the system may comprise one or more other circuitries. Various circuitries of the system may be electronically coupled between and/or among each other to transmit and/or receive energy, data and/or information.

In some examples, embodiments may take the form of a computer program product on a non-transitory computer-readable storage medium storing computer-readable program instruction (e.g., computer software). Any suitable computer-readable storage medium may be utilized, including non-transitory hard disks, CD-ROMs, flash memory, optical storage devices, or magnetic storage devices.

Many modifications and other embodiments of the present disclosure set forth herein will come to mind to one skilled in the art to which these embodiments pertain having the benefit of the teachings presented in the foregoing descriptions and the associated drawings. Therefore, it is to be understood that the disclosure are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A sensing device comprising:
  a support unit comprising a first frame and a second frame, wherein a first end of the first frame and a first end of the second frame are configured to mechanically couple to a surface;
  a pin joint configured to mechanically couple the first frame to the second frame, such that a first relative movement between the first end of the first frame and the first end of the second frame is amplified to a second relative movement between a second end of the first frame and a second end of the second frame, wherein a first distance between the pin joint and a first line passing through the first end of the first frame and the first end of the second frame is less than a second distance between the pin joint and a second line passing through the second end of the first frame and the second end of the second frame; and a sensor mechanically coupled to the second end of the first frame and the second end of the second frame, the sensor configured to sense the second relative movement between the second end of the first frame and the second end of the second frame.

2. The sensing device of claim 1, wherein the first relative movement is caused by a deformation of the surface.

3. The sensing device of claim 2, wherein the surface is on a bottom cover of an electric vehicle facing a battery of the electric vehicle.

4. The sensing device of claim 3, wherein the battery comprises a battery cell structure, wherein the battery cell structure and the bottom cover form a chassis of the electric vehicle.

5. The sensing device of claim 2, wherein the sensor comprises a resistive strain gauge wherein a resistance varies due to the second relative movement and wherein the deformation is detected when the resistance is outside a normal resistance range.

6. The sensing device of claim 2, wherein the sensor comprises a capacitive strain gauge wherein a capacitance of the strain gauge sensor varies due to the second relative movement and wherein the deformation is detected when the capacitance is outside a normal capacitance range.

7. The sensing device of claim 2, wherein the sensor comprises an inductive strain gauge wherein an inductance of the strain gauge sensor varies due to the second relative movement and wherein the deformation is detected when the inductance is outside a normal inductance range.

8. The sensing device of claim 2, wherein the sensor comprises a piezoelectric material, wherein the piezoelectric material generates a voltage due to the second relative movement and wherein the deformation is detected when the voltage is outside a normal voltage range.

9. The sensing device of claim 1, wherein the first frame crosses the second frame at the pin joint and the first and second frames are each configured to pivot independently around the pin joint.

10. A method comprising:

amplifying a first relative movement between a first location and a second location on a surface using a first frame and a second frame mechanically coupled to the first and second locations respectively and mechanically coupled to each other at a pin joint, wherein a first distance between the pin joint and a first line passing through the first end of the first frame and the first end of the second frame is less than a second distance between the pin joint and a second line passing through the second end of the first frame and the second end of the second frame;

generating a second relative movement resulting from the amplification of the first relative movement by the support unit;

varying an electrical property of an electrical component using the second relative movement; and detecting a deformation of the surface using an amount of variation in the electrical property.

11. The method of claim 10, further comprising:

measuring the electrical property of the electrical component;

comparing the electrical property of the electrical component with a first threshold and with a second threshold; and determining the deformation of the surface when the electrical property is higher than a first threshold or lower than a second threshold.

12. The method of claim 11, wherein the surface is on a bottom cover of an electric vehicle facing a battery of the electric vehicle.

13. The method of claim 12, wherein the battery comprises a battery cell structure, wherein the battery cell structure and the bottom cover form a chassis of the electric vehicle.

14. The method of claim 10, wherein the electrical component comprises a resistive strain gauge and the electrical property comprises a resistance configured to vary due to the second relative movement and the method comprising detecting the deformation when the resistance is outside a normal resistance range.

15. The method of claim 10, wherein the electrical component comprises a capacitive strain gauge and the electrical property comprises a capacitance configured to vary due to the second relative movement and the method comprising detecting the deformation when the capacitance is outside a normal capacitance range.

16. The method of claim 10, wherein the electrical component comprises a piezoelectric material and the electrical property comprises a voltage generated by the piezoelectric material due to the second relative movement and the method comprising detecting the deformation when the voltage is outside a normal voltage range.

17. The method of claim 10 further comprising generating an alarm when the deformation is detected.

18. A sensing system comprising:

a plurality of support units each comprising a first frame and a second frame, wherein a first end of each first frame and a first end of each second frame are configured to mechanically couple to a surface; a pin joint configured to mechanically couple each first frame to each corresponding second frame, such that a first relative movement between the first end of the first frame and the first end of the corresponding second frame is amplified to a second relative movement between a second end of the first frame and a second end of the corresponding second frame, wherein a first distance between the pin joint and a first line passing through the first end of the first frame and the first end of the second frame is less than a second distance between the pin joint and a second line passing through the second end of the first frame and the second end of the second frame; and a sensor mechanically coupled to second ends of the plurality of the first frames and second ends of the plurality of the second frames, the sensor configured to sense the second relative movement.

19. The sensing system of claim 18, wherein the sensor comprises an electrical component configured to have a variable electrical property as a result of the second relative movement, the sensing system comprising a controller configured to determine a deformation of the surface using an amount of variation in the electrical property.

* * * * *